US007856217B1

(12) United States Patent
Chan

(10) Patent No.: US 7,856,217 B1
(45) Date of Patent: *Dec. 21, 2010

(54) TRANSMISSION AND RECEIVER SYSTEM OPERATING ON MULTIPLE AUDIO PROGRAMS

(76) Inventor: Hark C. Chan, 6827 St Andrews Dr., Mukilteo, WA (US) 98275

( * ) Notice: Subject to any disclaimer, the term of this patent is extended or adjusted under 35 U.S.C. 154(b) by 205 days.

This patent is subject to a terminal disclaimer.

(21) Appl. No.: 12/276,928

(22) Filed: Nov. 24, 2008

Related U.S. Application Data

(63) Continuation of application No. 12/034,566, filed on Feb. 20, 2008, now abandoned, which is a continuation of application No. 11/145,136, filed on Jun. 3, 2005, now Pat. No. 7,369,824, which is a continuation of application No. 10/364,554, filed on Feb. 12, 2003, now Pat. No. 6,904,270, which is a continuation of application No. 09/496,528, filed on Feb. 2, 2000, now Pat. No. 6,600,908.

(60) Provisional application No. 60/118,540, filed on Feb. 4, 1999, provisional application No. 60/120,923, filed on Feb. 22, 1999, provisional application No. 60/140,742, filed on Jun. 25, 1999, provisional application No. 60/144,259, filed on Jul. 19, 1999.

(51) Int. Cl.
*H04B 1/18* (2006.01)

(52) U.S. Cl. .............. 455/150.1; 455/156.1; 455/186.1; 455/161.1; 455/166.1; 455/158.1; 348/725; 348/468; 709/219; 370/392; 370/395.64; 370/468

(58) Field of Classification Search .............. 455/150.1, 455/186.1, 156.1, 161.1, 161.2, 3.06, 166.1, 455/185.1, 158.1; 709/219; 348/725, 468; 370/392, 395.64
See application file for complete search history.

(56) References Cited

U.S. PATENT DOCUMENTS

| | | | | |
|---|---|---|---|---|
| 4,006,447 | A | | 2/1977 | Narbaits et al. |
| 4,499,601 | A | | 2/1985 | Matthews |
| 5,095,532 | A | | 3/1992 | Mardus |
| 5,119,507 | A | | 6/1992 | Mankovitz |
| 5,134,719 | A | * | 7/1992 | Mankovitz ............... 455/154.1 |
| 5,161,251 | A | * | 11/1992 | Mankovitz ................. 455/66.1 |
| 5,195,109 | A | | 3/1993 | Bochmann et al. |
| 5,276,909 | A | | 1/1994 | Milner et al. |
| 5,355,527 | A | | 10/1994 | Owaki |
| 5,406,626 | A | | 4/1995 | Ryan ............................ 380/9 |
| 5,428,610 | A | | 6/1995 | Davis .......................... 370/73 |

(Continued)

OTHER PUBLICATIONS

Office Action of U.S. Appl. No. 11/078,868 (Pat. No. 7,403,753) dated Sep. 7, 2007.

(Continued)

*Primary Examiner*—Marceau Milord

(57) ABSTRACT

A receiver contains a demodulator system that can extract digital data from wireless radio frequency signal. The digital data contains two sets of compressed digital audio data corresponding to two audio programs. The receiver also contains two decompressors. If a user selects a first audio program, a first compressor is used to decompress a first set of compressed digital audio data. If a user selects a second audio program, a second decompressor is used to decompress a second set of compressed digital audio data. The wireless radio frequency signal can be transmitted using a transmitter.

25 Claims, 7 Drawing Sheets

U.S. PATENT DOCUMENTS

| | | | | |
|---|---|---|---|---|
| 5,442,646 | A | 8/1995 | Chadwick et al. | 371/43 |
| 5,477,487 | A | 12/1995 | Greenberg | |
| 5,483,506 | A | 1/1996 | Yoshioka et al. | 369/7 |
| 5,497,372 | A | 3/1996 | Nankoh et al. | |
| 5,524,051 | A | 6/1996 | Ryan | 380/9 |
| 5,524,279 | A | 6/1996 | Keba et al. | 455/52.1 |
| 5,548,828 | A | 8/1996 | Kozaki et al. | |
| 5,557,302 | A | 9/1996 | Levinthal et al. | |
| 5,561,649 | A | 10/1996 | Mankovitz | |
| 5,561,848 | A | 10/1996 | Mankovitz | |
| 5,561,849 | A * | 10/1996 | Mankovitz | 455/45 |
| 5,572,442 | A | 11/1996 | Schulhof et al. | 364/514 |
| 5,689,245 | A | 11/1997 | Noreen et al. | |
| 5,708,662 | A | 1/1998 | Takashima | |
| 5,734,780 | A | 3/1998 | Ichiura et al. | 386/46 |
| 5,734,973 | A | 3/1998 | Honda | 455/186.1 |
| 5,745,525 | A | 4/1998 | Hunsinger et al. | 375/285 |
| 5,774,798 | A | 6/1998 | Gaskill | |
| 5,809,065 | A | 9/1998 | Dapper et al. | 375/216 |
| 5,809,472 | A | 9/1998 | Morrison | 704/500 |
| 5,815,671 | A | 9/1998 | Morrison | 395/200.71 |
| 5,841,979 | A | 11/1998 | Schulhof et al. | 395/200.67 |
| 5,850,415 | A | 12/1998 | Hunsinger et al. | 375/216 |
| 5,864,305 | A | 1/1999 | Rosenquist | 340/905 |
| 5,881,365 | A * | 3/1999 | Yang et al. | 455/45 |
| 5,898,910 | A * | 4/1999 | Miyake et al. | 455/186.1 |
| 5,953,068 | A | 9/1999 | Jacobsen | |
| 5,956,628 | A | 9/1999 | Owaki | |
| 5,991,334 | A | 11/1999 | Papadopoulos et al. | |
| 6,011,854 | A | 1/2000 | Van Ryzin | |
| 6,057,890 | A | 5/2000 | Virden et al. | |
| 6,075,813 | A | 6/2000 | Chen et al. | |
| 6,088,455 | A | 7/2000 | Logan et al. | |
| 6,144,705 | A | 11/2000 | Papadopoulos et al. | |
| 6,154,452 | A | 11/2000 | Marko et al. | 370/321 |
| 6,161,002 | A | 12/2000 | Migliaccio et al. | |
| 6,163,683 | A | 12/2000 | Dunn et al. | |
| 6,240,280 | B1 * | 5/2001 | Ravi et al. | 455/161.1 |
| 6,289,207 | B1 | 9/2001 | Hudecek et al. | |
| 6,351,500 | B2 | 2/2002 | Kumar | 375/270 |
| 6,389,271 | B1 | 5/2002 | Kaneko | |
| 6,411,800 | B1 | 6/2002 | Emerson, III | |
| 6,493,291 | B2 * | 12/2002 | Nagano | 369/7 |
| 6,600,908 | B1 * | 7/2003 | Chan | 455/150.1 |
| 6,621,933 | B2 * | 9/2003 | Chung et al. | 382/233 |
| 6,650,717 | B1 | 11/2003 | Cupo et al. | |
| 6,757,913 | B2 * | 6/2004 | Knox | 725/153 |
| 6,765,929 | B1 | 7/2004 | Cupo et al. | |
| 6,862,636 | B2 * | 3/2005 | Young | 710/69 |
| 6,904,270 | B1 * | 6/2005 | Chan | 455/156.1 |
| 6,990,312 | B1 * | 1/2006 | Gioscia et al. | 455/3.06 |
| 7,055,166 | B1 * | 5/2006 | Logan et al. | 725/32 |
| 7,149,472 | B2 * | 12/2006 | Reagor et al. | 455/40 |
| 7,257,536 | B1 * | 8/2007 | Finley et al. | 704/270 |
| 7,308,236 | B2 * | 12/2007 | Fukushima | 455/179.1 |
| 7,369,824 | B1 * | 5/2008 | Chan | 455/150.1 |
| 7,376,414 | B2 * | 5/2008 | Engstrom | 455/414.3 |
| 7,403,753 | B1 * | 7/2008 | Chan | 455/156.1 |
| 7,423,982 | B2 * | 9/2008 | Briggs et al. | 370/259 |
| 7,508,789 | B2 * | 3/2009 | Chan | 370/328 |
| 7,522,554 | B2 * | 4/2009 | Chan | 370/328 |
| 7,627,750 | B1 * | 12/2009 | Chan | 713/156 |
| 7,778,614 | B1 * | 8/2010 | Chan | 455/150.1 |

OTHER PUBLICATIONS

Response to Office Action of U.S. Appl. No. 11/078,868 (Pat. No. 7,403,753) submitted Oct. 1, 2007.

A J Bower, "Digital Audio—The Eureka 147 DAB System", Electronic Engineering, Apr. 1998.

"Eureka-147—Digital Audio Broadcasting", Eureka-147 Project Publication, Aug. 1997.

* cited by examiner

TRANSMISSION AND RECEIVER SYSTEM OPERATING ON MULTIPLE AUDIO PROGRAMS

CROSS-REFERENCE TO RELATED APPLICATIONS

This application is a continuation of patent application Ser. No. 12/034,566, filed Feb. 20, 2008 now abandoned, which is a continuation of patent application Ser. No. 11/145,136, filed Jun. 3, 2005, now U.S. Pat. No. 7,369,824, which is a continuation of patent application Ser. No. 10/364,554, filed Feb. 12, 2003, now U.S. Pat. No. 6,904,270, which is a continuation of patent application Ser. No. 09/496,528, filed Feb. 2, 2000, now U.S. Pat. No. 6,600,908, which claims the benefit of U.S. Provisional Application Ser. Nos. 60/118,540, filed Feb. 4, 1999, 60/120,923, filed Feb. 22, 1999, 60/140,742 filed Jun. 25, 1999 and 60/144,259 filed Jul. 19, 1999. All these provisional and nonprovisional patent applications are incorporated herein by reference.

BACKGROUND OF THE INVENTION

This invention relates to broadcasting, and more specifically to a broadcasting system that allows a listen to receive, on demand, selected information from a receiver.

Radio and television (TV) receivers are the most widely available entertainment devices in the world. Almost every car has a radio receiver. Radio receivers may also be found in offices, restaurants, etc. Almost every home in U.S. has a TV.

A conventional receiver contains a tuner that can be tuned to broadcast stations, each of them transmits signals at a predetermined radio frequency. In order to attract listeners, many broadcast stations concentrate on predetermined types of program materials. For example, some radio stations spend 80% of broadcast time on news while other stations spend 90% of broadcast time on music. Thus, music lovers would tune to a “music” radio station and news lovers would tune to a “news” station. Similarly, TV stations broadcast movies, sports, news, etc. at pre-scheduled times to match the viewing habit of most viewers. However, the interest of listeners/viewers may change briefly during the day. For example, a music lover may be interested in stock reports (e.g., Dow Jones average) in late afternoon (after the close of the stock exchanges) because he/she owns stocks. Many music stations do not announce stock reports. Thus, the music lover has to switch to a news station because many news stations announce stock reports at more frequent intervals (e.g., once every fifteen minutes). It is unlikely that the switch is made at the exact time when a stock report is announced. Thus, the music lover would have to listen to other news (which may be irrelevant to him/her) for a few minutes. Afterwards, the music lover has to switch back to the original music station. Similarly, almost all TV stations broadcast stock reports only during news programs. Thus, the viewer has to turn to other media (e.g., radios) to obtain the reports. This is frustrating for listener/viewers. It is also undesirable to the broadcast stations because they would like to keep their listeners tuned in all the time.

SUMMARY OF THE INVENTION

The present invention relates to a broadcast system that can provide, on demand, useful information to users. A broadcast station transmits radio frequency signals containing on-demand, main program, and (optional) index materials to a plurality of receivers. The receivers contain means for separating the on-demand (and also the index) materials from the main program material. The receivers contain a signal switch for selecting one of the materials. A user can decide to listen to any of these materials by pressing a button. The receivers contain control logic that can direct the signal switch to select the desired material. After the on-demand material is played, the signal switch automatically switches back to the main program material.

These and other features and advantages of the present invention are described by the following detailed description of the preferred embodiments together with the accompanying drawings.

DETAILED DESCRIPTION OF THE INVENTION

The present invention comprises a novel broadcast based information on demand system and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
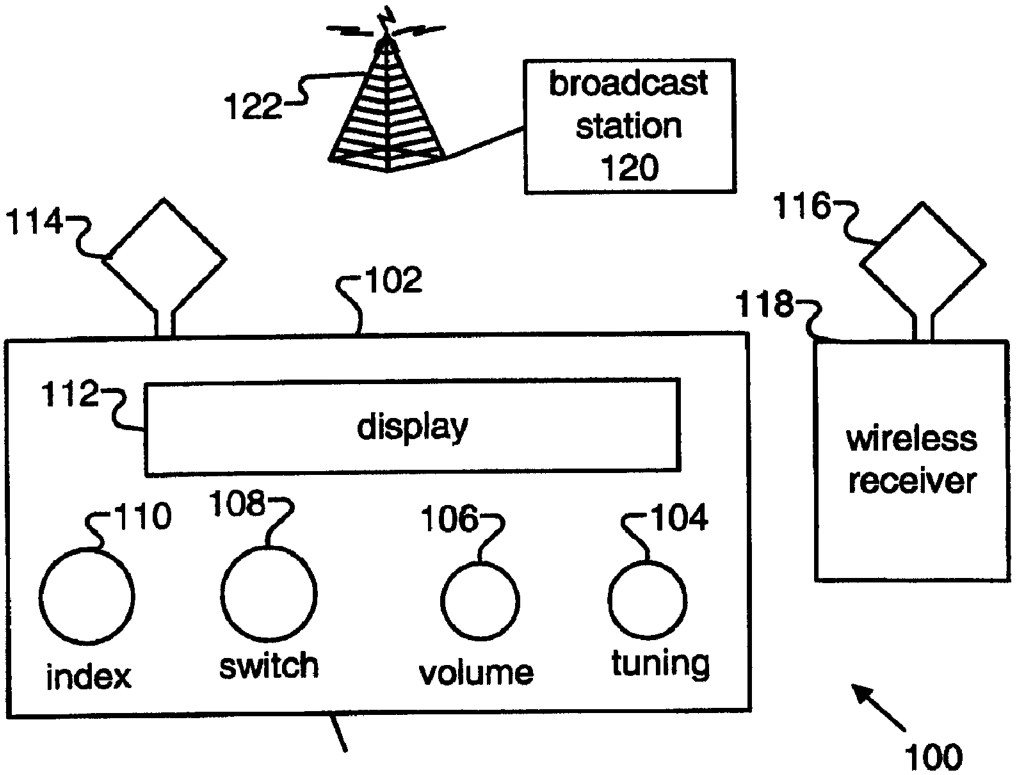
FIG. 1 is a schematic diagram showing a broadcasting system of the present invention.

FIG. 1 is a schematic drawing showing a broadcasting system 100 of the present invention. System 100 contains a broadcast station 120 broadcasting radio frequency signals using an antenna 122 to a plurality of receivers. In FIG. 1, two receivers 102 and 118 are shown. Broadcasting station 120 broadcasts several program materials to the receivers: a main program material and one or more “audio information on demand” (or simply “on-demand”) program materials. Broadcasting station 120 may also broadcast an index to the on-demand program material. The on-demand program materials are information (to be rendered in audio form) that is announced to a listener at the time requested by the listener. The main program material is material that is of interest to the majority of listeners most of the times. Preferably, most of the broadcasting resources and bandwidth are devoted to broadcasting the main program material. As an example, the main program material of a “music” station consists of music together with occasional announcements and advertisements. Listeners are typically interested in the on-demand information during some of the times. For example, some listeners of the music station may be interested in traffic condition during rush hours and other listeners may be interested in sports scores after sports events. Thus, the on-demand materials of broadcast station 120 consist of traffic condition information and sports scores information.

In some situation, broadcast station 120 may broadcast commands to the radio receivers. These commands instruct the receivers to perform certain tasks. They are not intended to be heard by listeners.

The structure of the receivers is substantially the same, and only receiver 102 is described in detail here. Receiver 102 contains an antenna 114 for receiving radio frequency signals broadcasted by various broadcast stations (including station 120). A listener can tune to one of the broadcast stations using a tuning button 104. The listener can use a volume button 106 to adjust the volume level of sound produced by a loudspeaker (not shown). Volume button 106 can also be used to turn on and turn off receiver 102. Receiver 102 contains an index button 110 for allowing the listener to select the type of on-demand program materials. A switch button 108 is provided so that the listener can switch between the main program material and the on-demand program material selected using index button 110. A display 112 may optionally be provided to show the status of radio receiver 102 (such as the frequency of the tuned station and the name of the selected on-demand program material). Noted that it may be possible to use a single button to perform more than one function. Further, one of the switch and index buttons may be eliminated (as explained in more details below). In addition, some of the functions may be performed using other means. For example, a voice-activated system or a remote controller can be used in place of buttons. Thus, the buttons in FIG. 1 are shown for illustrative purpose only.

In the present invention, a music station can devote almost all the main program material on music, and does not need to interrupt the music to broadcast other information (e.g., traffic condition during rush hours). If the listener is interested in traffic condition (or weather), he/she can select the on-demand program material for traffic condition (or weather) using index button 110. Anytime the listener wishes to listen to the traffic condition (or weather), he/she can press switch button 108, and radio station 102 will announce the most current information on traffic condition (or weather). After the announcement, radio receiver 102 automatically switches back to the main program material (if desired). Compared to conventional broadcasting systems, this system is more useful to the listener because it is convenient and the information can be obtained on demand. Broadcast stations also like this system because listeners can stay at the same station all the time and there is no need for the listener to tune to a competing broadcast station (e.g., news station).

Figure 2:
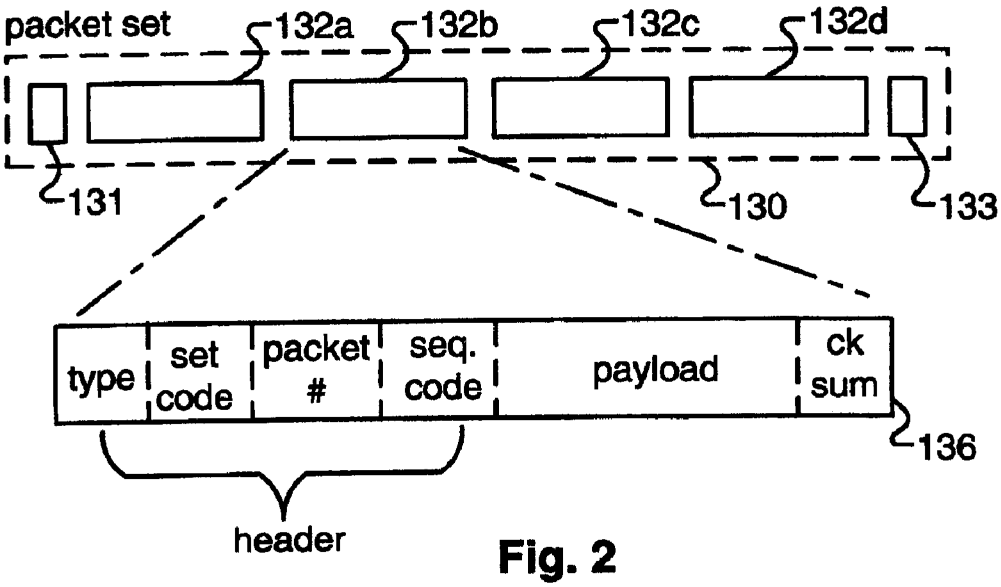
FIG. 2 shows the structure of data packets of the present invention.

In the present invention, the main program material may be analog or digital. However, the on-demand program material and the associated index material are encoded as digital data. In addition, broadcast station 120 may broadcast commands to instruct radio receivers to perform certain tasks. The data and the commands are preferably transmitted as data packets. FIG. 2 shows the structure of the packets of the present invention. The packets can be grouped into sets. For example, the packets for "weather" can be grouped into one set and the packets for "sports" can be grouped into a second set. The structure of an exemplary set is shown as 130 in FIG. 2. It preferably comprises a start packet 131, a plurality of content packets (such as packets 132*a*-132*d*), and an end packet 133. The start packet indicates the starting point of a set. It preferably contains other information about the set (such as the total number of packets in the set). The content packets contain the commands or digitized audio data. The end packet preferably contains an error detection index, such as the checksum of all the packets in the set. These three types of packets can be distinguished using conventional methods (e.g., by assigning a "type" field to each packet).

An exemplary packet 136 is shown in FIG. 2. Packet 136 contains a header, a payload, and an error detection code (such as a check sum of this packet). The header packet preferably contain four fields: The first field ("type") is used to indicate whether it is a start, content, or end packet. The second field ("set code") is used to distinguish between different sets within the type (e.g., set 1 represents traffic condition, set 2 represents weather, etc.). This field may also have an optional subfield to indicate whether the set is on-demand, index, or command materials. The third field (packet #") indicates the position of the current packet within the set (e.g., the fifth packet within a set of ten packets). This field is optional if the delivery mechanism is reliable or if the set contains only one packet (e.g., a command can normally be carried in one packet). However, if some of the packets need to be retransmitted (e.g., they contain error) or are out of order, this field allows the receiver to more easily reassemble the data. Note that other fields may also be added to the packets.

On-demand program packets may optionally contain a field for a sequence code. An example (e.g. "weather") is used here to illustrate the usage of the sequence code. Weather information is typically updated once every one to two hours. Thus, the same information remains unchanged until new update is received. Thus, the on-demand program packets used to deliver the same weather information are assigned the same sequence code. After the weather information is updated, the new set of on-demand program packets for the new announcement is assigned another (e.g., the next) sequence code. The application of the sequence code will be further described below.

The content of the digital data in the payload varies with the type of packets. If the packet is a start packet, the payload preferably contains overall information about the set (e.g., the total number of packets in the set). If the packet is a content packet, the payload contains digitized audio data. If the packet is an end packet, the payload preferably contains a check sum. If the packet is a command packet, the payload contains an instruction to the receivers. An exemplary instruction is to ask the receivers to tune to a new station having a certain frequency.

In the following description, it is assumed (for illustrative purpose only) that there are three kinds of on-demand program materials: traffic condition, weather, and sports scores. The "set code" of the packets contains a code for these kinds (e.g., "A1" for traffic condition, "A2" for weather, "A3" for sports scores, etc.). Each kind of on-demand program is optionally associated with an index packet. If this is the case, the "set code" contains a subfield to distinguish between on-demand content and index packets. For example, "0A1" and "1A1" are used to designate weather-on-demand content and weather-index data, respectively.

The payload of each index packet contains compressed audio data of the name of the corresponding on-demand program. For example, the payload of the index packet for "traffic condition" contains compressed audio data of a human voice for the words "traffic condition." The payload of the on-demand program packets contains compressed audio data of the information carried by the program. For example, the payload of the "traffic condition" packet contains compressed audio data of a human voice describing the traffic condition on various highways.

Figure 3:
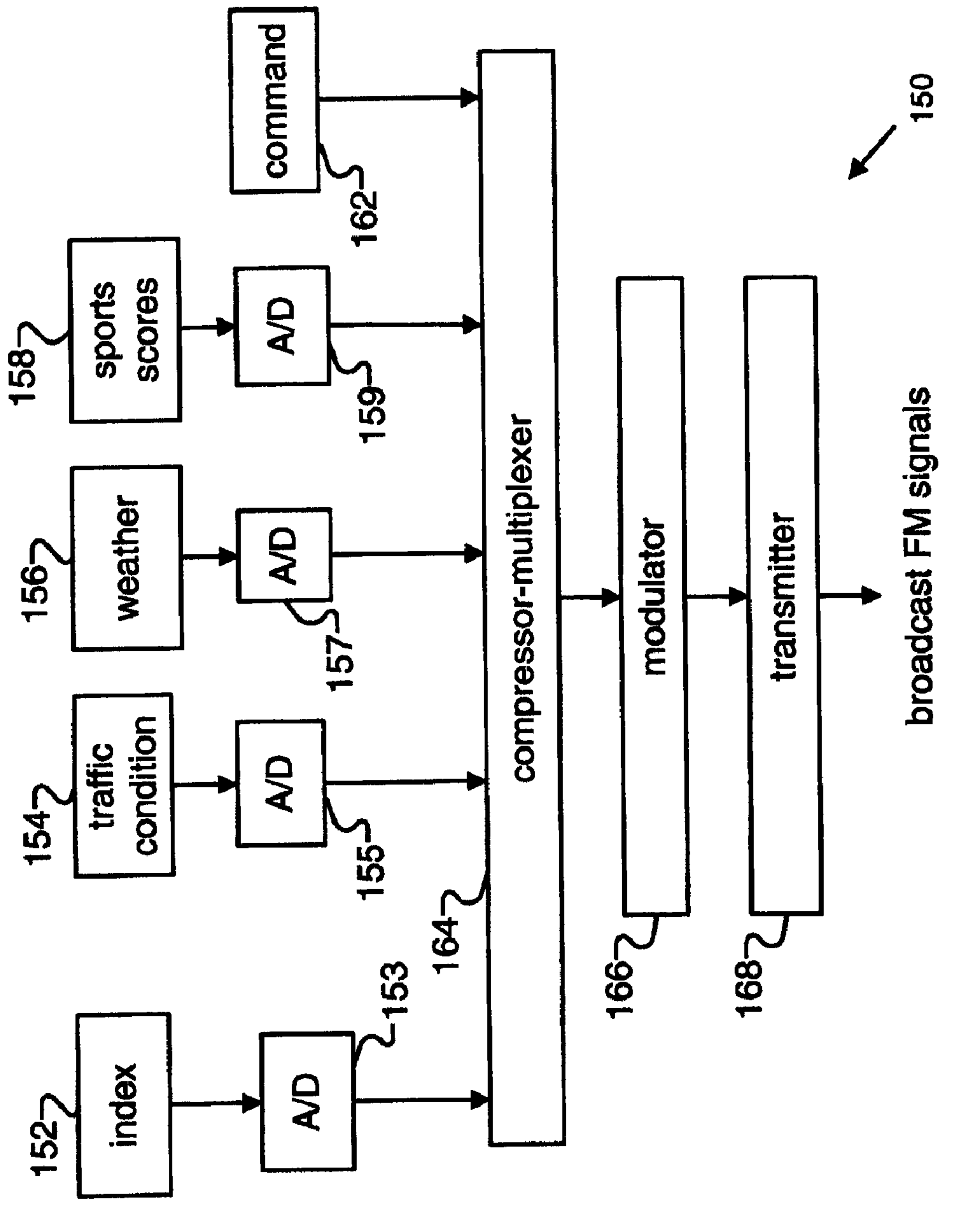
FIG. 3 is a block diagram of a transmitter system of the present invention.

FIG. 3 is a block diagram of the structure of a transmitter system 150 of the present invention located in broadcast station 120. Transmitter system 150 contains analog source material 152 for the index. This material is the human voice for the words used in the various index packets. The source material is digitized using an analog-to-digital (A/D) converter 153. Similarly, analog source materials 154, 156 and 158 for on-demand program materials are human voice for the corresponding on-demand information. They are digitized using A/D converters 155, 157, and 159, respectively. Command material 162 may also be included. Because the command material is digital in nature, it does not need to be converted. The digital data is sent to a compressor-multiplexer 164 that compresses some or all of the digital data (if needed), encapsulate the compressed data in packet form, and combine the packets into a single serial data stream. The data stream is delivered to a modulator 166 that modulates a radio frequency carrier. The radio frequency signal is transmitted using a transmitter 168.

The index and on-demand program materials are preferably interleaved to take into account of user expectations. For example, the complete set of index packets is preferably transmitted once every one to two seconds. Thus, a listener does not have to wait for too long after pressing index button 110 to listen to the index. In addition, it is known that digital packets corresponding to audio signals need to be delivered to a receiver within certain time intervals (e.g., 120 mini-second between two packets) to maintain normal audio flow. Thus, the packets should be arranged carefully.

An implementation of the present invention in a digital radio broadcast system is now described. In this implementation, all the program materials (main, on-demand and index) broadcasted by broadcast station 120 are in digital format. The main program material is preferably compressed prior to broadcasting in order to reduce bandwidth demand. Because the main program material may contain music, it is important to preserve the high fidelity quality of the original source. Consequently, a music quality compressor (with relatively low compression ratio) is preferably used. On the other hand, the on-demand program and index materials contain mostly voice, and may be compressed using a high compression ratio algorithm.

Figure 4A:
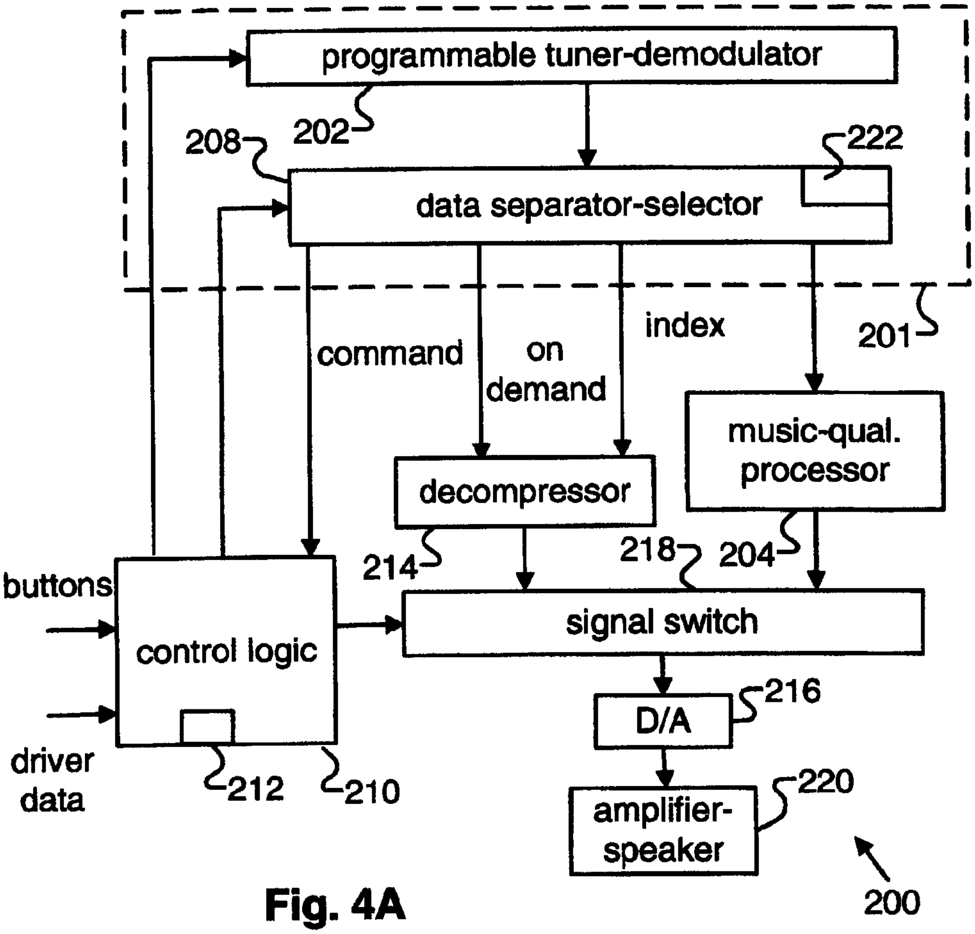
FIGS. 4A and 4B are schematic diagrams of an electrical portion of a receiver of the present invention.

FIG. 4A is a schematic diagram of an electrical portion 200 of radio receiver 102 of the present invention. It contains a digital data extractor 201 that comprises a programmable tuner-demodulator 202 and a data separator-selector 208. Tuner-demodulator 202 can be used by a listener to select a broadcast station. It also demodulates the tuned radio frequency signals and delivers a stream of digital data to a data separator-selector 208. As explained below, the programmable feature of tuner-demodulator 202 is optional. Data separator-selector 208 delivers the main program material to a music-quality processor 204. In this embodiment, processor 204 performs decompression function. In one embodiment of the present invention, the main program material is compressed using a music quality compression algorithm called the Motion Picture Experts Group Layer 3 Audio ("MP3"). Note that other high quality compression algorithms may be used. Data separator-selector 208 also decapsulates the packets of the present invention and selects the command material, index material or on-demand program material. The selection is controlled by a control logic 210.

Control logic 210 is connected to appropriate button(s) of receiver 102 shown in FIG. 1. Thus, it translates the selection of a listener into actions by receiver 102. If index button 110 is pressed, control logic 210 instructs data selector 208 to select index material. The selected index material is delivered to a decompressor 214 which processes the voice data in real-time. The decompressed voice data is delivered to a signal switch 218. At the same time, the set code (e.g., A1) of the selected index material is stored in a register file 212 of control logic 210. Control logic 210 instructs signal switch 218 to connect decompressor 214 to a digital-to-analog converter 216, which is in turn connected to an audio output device (such as an amplifier-speaker 220). Depending on the index material selected by data selector 208, the appropriate sound signal (e.g., the words "traffic condition") is deliver to amplifier-speaker 220. Consequently, the listener can hear the sound "traffic condition" from the speaker.

While decompressor 214 is processing the voice data, data selector 208 can continue to receive other index packets. The digital data for each index materials can optionally be stored in a memory 222. The size of memory 222 should be small because the number of index materials and their sizes are small. This could speed up the response time for the index material because the data is already stored in memory 222.

If the listener presses index button 110 again within a predetermined time interval (e.g., one to two seconds), it is likely that the listen wishes to listen to other information. Thus, the above-described steps for selecting another index are repeated. Specifically, control logic 210 instructs data selector 208 to select a new index material. Data selector 208 can determine whether an index material is new by using the set codes that have been previously stored in register file 212. Alternatively, this information can be stored in memory 222. The new index material is delivered to decompressor 214. The word "weather" is pronounced by amplifier-speaker 220. The new index code is stored in register file 212.

If the listener does not press index button 110 again within the predetermined time interval, control logic 210 assumes that the listener has made a selection. Control logic 210 then sends to data selector 208 the selected set code and a request that the corresponding on-demand program material be selected. Data selector 208 delivers the corresponding on-demand program material to decompressor 214. Control logic 210 directs signal switch 218 to connect decompressor 214 to D/A converter 216. The selected on-demand program (e.g., traffic condition) is played on amplifier-speaker 220. When all the data is processed (indicated by an "end" packet), decompressor 214 sends a notification to control logic 210. Control logic 210 directs switch 218 to connect music quality processor 204 to D/A converter 216. As a result, the main program material is automatically played again.

Subsequent to the selection by index button 110, the listener can press switch button 108 anytime he/she wishes to listen to the selected on-demand program material instead of the main program material. Control logic 210 sends to data selector 208 the set code stored in register file 212 and a request for on-demand program material. Control logic 210 also directs signal switch 218 to connect decompressor 214 to D/A converter 216. After the on-demand program is played (as indicated by an end packet), decompressor 214 sends a notification to control logic 210. Control logic 210 then directs switch 218 to connect music quality processor 204 back to D/A converter 216 again.

The human voice used in the index and on-demand program materials is preferably compressed using parametric-type compression algorithms. These algorithms deliver human voice of reasonable quality using very low bandwidth. An example of such an algorithm is one described under International Telecommunication Union's Recommendation G.723.1. It can deliver telephone quality sound at 5.3 or 6.3 kilobits per second. Other compression algorithm could also be used.

Figure 4B:
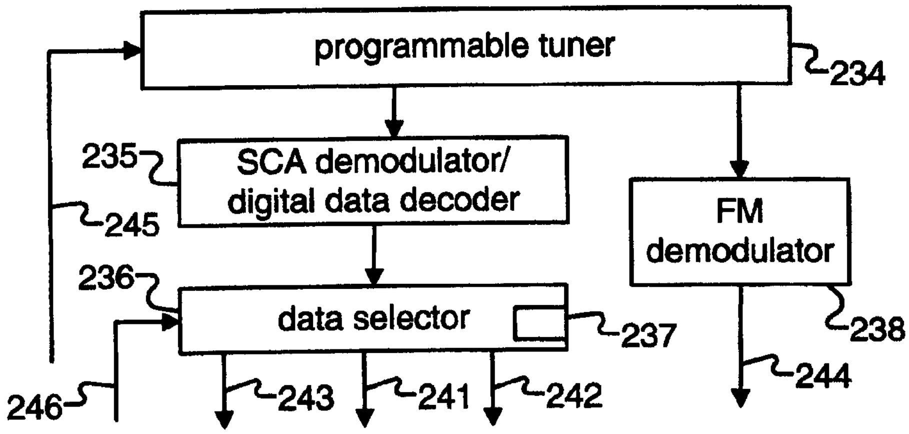
Figure 4C:
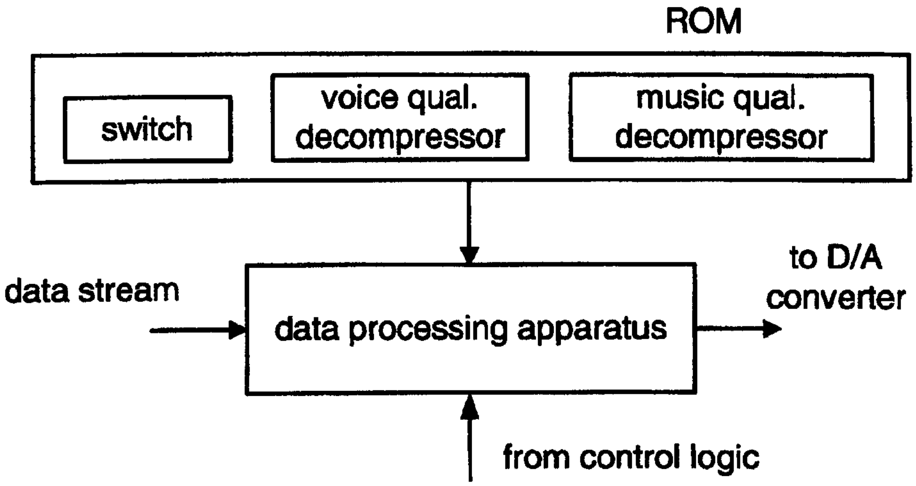
FIG. 4C shows another embodiment of a portion of the electrical portion of the present invention.

It should be noted that music-quality processor 204 and decompressor 214 could be software algorithms executed by the same data processing apparatus. FIG. 4C shows an embodiment in which software modules are used to perform the operation of decompressor 214, music-quality processor 204 and signal switch 218. This embodiment contains a data processing apparatus (which could be a digital signal processor or a microcontroller) and a read-only memory (ROM). The ROM contains a switch module, a voice quality decompressor and a music quality decompressor. The data stream from data separator-selector 208 of FIG. 4A is delivered to the data processing apparatus. Depending on the signal from control logic 210, the switch module in ROM will select either voice quality decompressor or music quality decompressor for execution. The decompressed data is delivered to D/A converter 216.

In another embodiment of electrical portion 200, each of decompressor 214 and music-quality processor 204 is connected to a separate D/A converter before connecting to switch 218. These two D/A converters can be individually designed to take advantage of the different characteristics of the two decompressors. In this case, D/A converter 216 in FIG. 4A is not needed.

There are broadcast stations that would like to offer many sets of on-demand program materials. However, the bandwidth assigned to a broadcast station is limited. One way to extend the number of sets is to use the bandwidth of more than one broadcast stations. Another way is to enlist the bandwidth of other frequency bands (such as the vertical and horizontal blanking intervals in the TV band, an unused TV band, or a narrow-band PCS). After data selector 208 of electrical portion 200 receives a command packet, it directs the packet to control logic 210. If the command is an instruction to temporarily switch to a new broadcast station, control logic 210 first stores the frequency of the old station (e.g., station 120) in register file 212. It then instructs tuner 202 to switch to the new broadcast station requested by the command. As a result, additional on-demand program materials can be delivered to the listener using a similar method as described above. When the delivery of the on-demand program materials is completed, control logic 210 instructs tuner 202 to switch back to station 120 using frequency information stored in register file 212. The switching operations are transparent to the listener. Note that a large number of stations can be accessed using this method. As a result, many sets of on-demand materials can be offered to the listener. Note that if this feature is not needed, tuner 202 does not need to be programmable.

In another embodiment of the present invention, there is no need to broadcast the index material, and consequently, there is no need to have an index button. This is because most on-demand program materials are easily identifiable by its contents. For example, it is easy to distinguish between a traffic condition announcement from a stock report announcement. In many cases, a listener can listen to just a few words, and can identify the kind of on-demand information. Thus, when the listener presses switch button 108 within a predetermined time interval (or while in the middle of an on-demand announcement), the next on-demand program material (e.g., weather) is selected. This is because the listener is likely to change selections if switch button 108 is pressed soon after a previous selection. However, if the listener presses switch button 108 in the middle of a main program, the previously selected on-demand program material is selected. This is because the listener is more likely to listen to the same selection of on-demand program if he/she had selected it before.

One aspect of the present invention is that the number, name and type of on-demand program materials are determined by the broadcast station and can be changed by the station at any time. There is no need to notify the listener before hand. This feature is different from some conventional systems in which the number, name and type of program materials are predetermined and cannot be changed. For these conventional systems, changes need to be pre-announced. A further aspect of the present invention is that the index materials can be announced in an audio form. There is no need for the listener to read display 112 to determine the name of the on-demand program. This feature is especially important when the listener is driving because it will be dangerous for the listener to read display 112.

As mentioned above, the inputs to control logic 210 are preferably buttons 108 and 110. An optional input to control logic 210 is the identity of the listener. This option is especially useful for automobile radios. Some automobile contains electrical adjustable seat positions and memory for storing the seat positions of several drivers. When a driver enters an automobile, he/she can press a seat-position selection button, and the seat will be set to a previously adjusted position. Thus, the seat position can be used as means for identifying individual drivers. Control logic 210 may use this button to set the preferred on-demand program material for individual driver. Thus, when the driver presses the seat-position button, the automobile can set the seat position and the on-demand program material (even though these settings have been changed by a previous driver). Thus, each driver can listen to his/her preferred on-demand program material without having to use the index button to re-select the on-demand program material.

An implementation of the present invention in a conventional analog radio broadcast system is now described. In this implementation, the main program materials is broadcasted using conventional AM and FM methods. However, the command, on-demand program and index materials are in digital format. For illustrative purposes, FM broadcast is described here, but the present invention may also be used in AM broadcast. Implementation of the present invention in TV broadcast will be disclosed in later sections.

In FM broadcast, an optional signal band from 53 kHz to 99 kHz may be multiplexed onto the main radio frequency carrier. In the United States, this optional band is called the Subsidiary Communications Authorization (SCA). This band can be used to carry analog and/or digital signals. In the present invention, a portion of this band may be devoted to carry the command, index and on-demand program materials. Methods have been developed to achieve a bandwidth of more than 16 kilobits per second in the SCA. Thus, at least two sets of on-demand program materials can be delivered in the SCA.

In order to implement this embodiment, only the digital data extractor 201 portion of the circuit in FIG. 4A and music quality processor 204 need to be changed. The changes are shown in FIG. 4B. A programmable tuner 234 is used to allow a user (and if necessary, control logic 210 of FIG. 4A) to select a broadcast station. The tuned signal is separated into two parts: the main program and SCA. The main program material (riding on the main radio frequency carrier) is delivered to a FM demodulator 238. It is an analog demodulator that derives an analog audio signal from the tuned radio frequency signal. The analog audio signal is connected to signal switch 218 of FIG. 4A through a line 244. The SCA signal is delivered to a SCA demodulator and digital data decoder 235. It recovers a stream of digital data corresponding to the serial data stream generated by transmitter system 150. This stream is delivered to a data separator-selector 236 that decapsulates the packets and selects the command material, index material or on-demand program material. The data on a line 243 corresponds to commands, and should be delivered to control logic 210. The data on lines 241 and 242 corresponds to on-demand and index materials, and should be delivered to decompressor 214. Data separator-selector 236 optionally contains a memory 237 that serves a similar function as memory 222 of FIG. 4A.

Programmable tuner 234 and data separator-selector 236 can be controlled by control logic 210 through lines 245 and 246, respectively.

Recently, there is research on a hybrid digital/analog radio broadcast system that simultaneously transmits both analog and digital signals within an allocated channel mask. The digital signals offers music quality audio broadcast. An advantage of this system is that it is backward compatible with existing analog receivers because the same program material is transmitted in both digital and analog forms. Based on the promoters of this system, it is believed that a FM-based system can provide an ancillary data channel having bandwidth substantially higher than that of the SCA. The same research indicates that a slower ancillary data channel can also be obtained in AM transmission. These ancillary data channels can be used to carry the compressed index and auxiliary program materials of the present invention. Consequently, the present invention is also applicable to this hybrid radio broadcast system.

Storing Index and On-Demand Program Material in Memory

In a different embodiment of the present invention, the index and/or on-demand program material may be stored in a memory of a radio receiver.

Figure 5A:
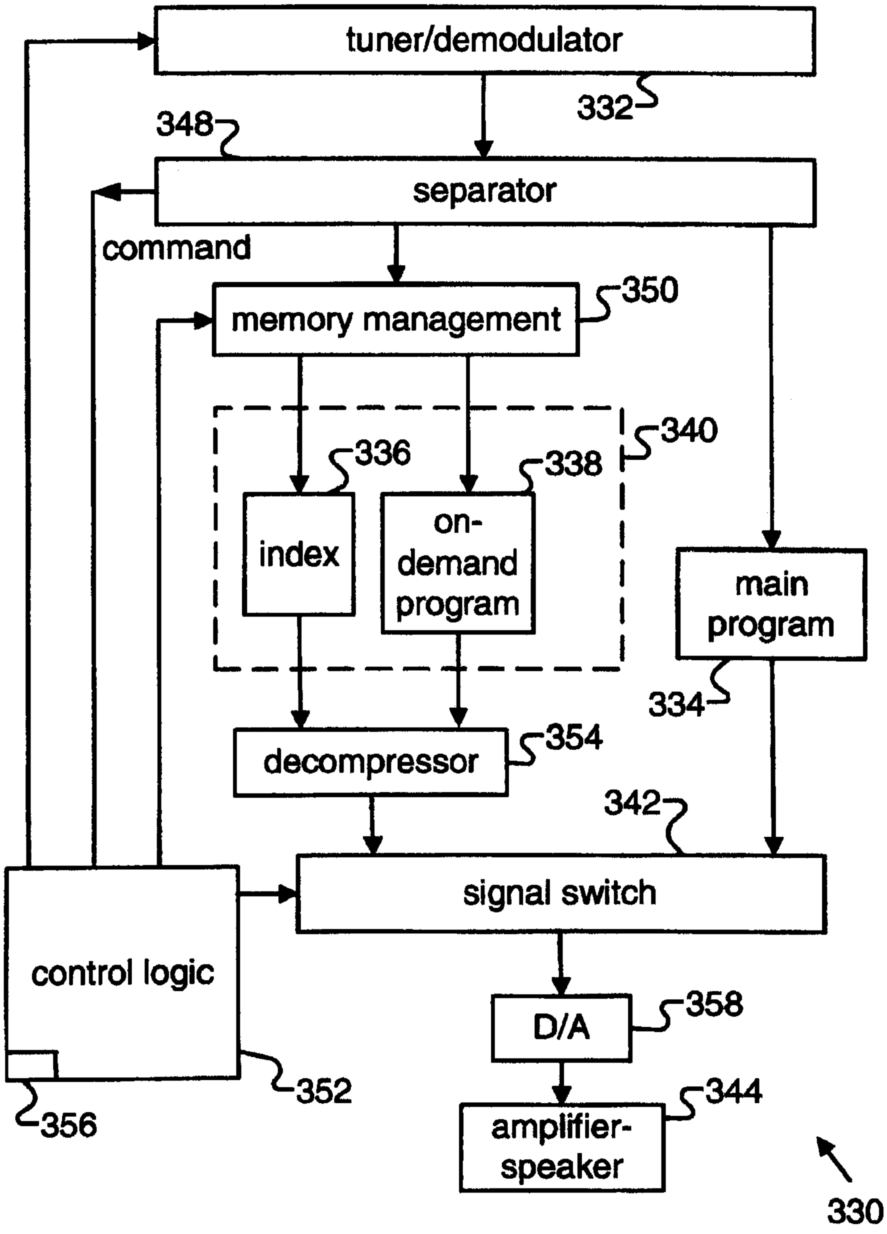
FIGS. 5A and 5B are schematic diagrams of another embodiment of an electrical portion of a receiver of the present invention.

FIG. 5A is a schematic diagram of an electrical portion 330 of radio receiver 102 of the present invention. Portion 330 contains a tuner/demodulator 332 that can be tuned to a station selected by a listener. It also demodulates, if needed, at least a portion of the radio frequency signal. As pointed out above in connection with FIG. 4A, tuner/demodulator 332 could be programmable. A separator 348 separates the received signal into individual portions: a main program portion, an (optional) index portion, and an on-demand program portion (which may contains several on-demand program materials). The main program portion is processed by a main program processor 334, and then delivered to a digital signal switch 342. The index and on-demand program portions are delivered to a memory management unit 350, which stores these portions into appropriate places in a memory 340. FIG. 5A shows that the index portion is stored in an index area 336 and the on-demand program portion is stored in an on-demand program area 338. The data stored in the index and on-demand program areas may be processed by a decompressor 354 (if the data transmitted by broadcast station 120 is compressed). Decompressor 354 is connected to signal switch 342, which is in turn connected to a digital-to-analog (D/A) converter 358. Converter 358 is connected to an amplifier-speaker 344

Figure 6:
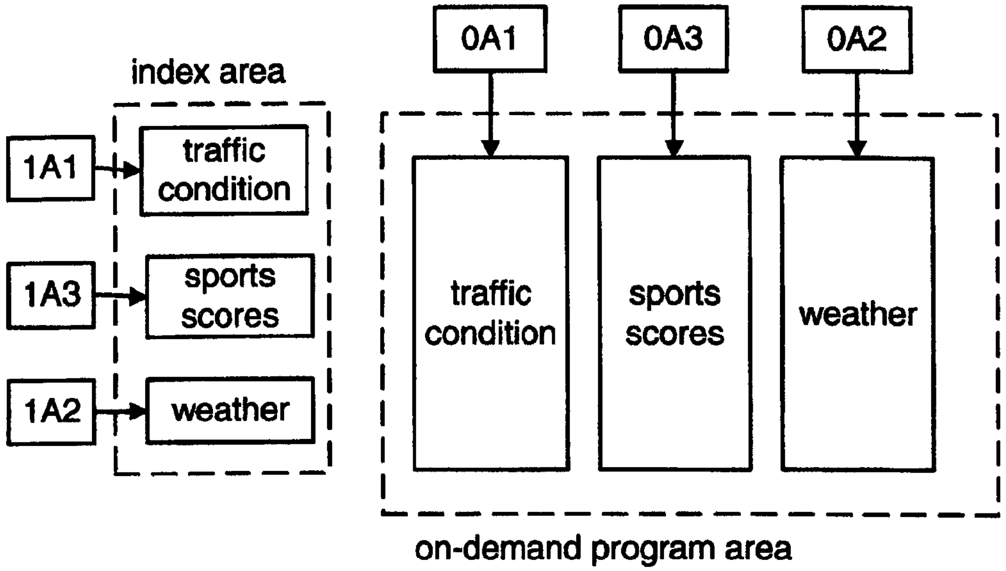
FIG. 6 is a schematic diagram of the logical structure of a memory device of the present invention.

FIG. 6 is a schematic diagram showing the logical structure of memory 340. This structure is managed by memory management unit 350. The set codes (e.g., A1, A2, etc.) and the subfield (e.g., "0" for on-demand program material and "1" for index material) can be used as pointers to the appropriate position in the index and on-demand program areas. Thus, FIG. 6 shows pointers "1A1", "1A2" and "1A3" pointing to the "traffic condition", "weather" and "sports scores" blocks, respectively, of the index area. The compressed voice data of the words "traffic condition", "weather" and "sports scores" will be stored in the appropriate blocks of the index area. Similarly, pointers "0A1", "0A2" and "0A3" point to the "traffic condition", "weather" and "sports scores" blocks, respectively, of the on-demand program area. Thus, the compressed voice data of the "traffic condition", "weather" and "sports scores" information will be stored in the appropriate blocks in the on-demand program area. It should be noted that even though each of the on-demand program materials (e.g., traffic condition) are shown to be located in one block, the data could be physically dispersed as long as they are logically linked together. Methods for linking physically separated data into a logical block are well known in the art.

In the present invention, broadcast station 120 broadcasts in regular time intervals the index packets. These packets are stored in the index area. Broadcast station 120 also broadcasts in regular intervals the on-demand program packets for each on-demand program. These packets are stored in the designated block of the on-demand program area. As explained below, the index and on-demand program materials can be accessed by the listener by pressing appropriate buttons of radio receiver 102.

In one embodiment of the present invention, memory management unit 350 examines the sequence code and packet number of the received index and on-demand program material. If the sequence code and packet number is the same as that of a previously validly stored data, memory management unit 350 does not need to process the data. Otherwise, the data in memory 340 is updated.

The use of memory 340, packet number, and check sum for each packet may improve performance. The reception of the on-demand and index portions is typically not as reliable as that of the main program material (e.g., the SCA power is typically lower than the main program power). This is especially true for automobile radio receivers because the automobile may pass through areas with high multipath interference. Thus, some of the on-demand/index packets may contain errors. The use of packet number and check sum allows these error packets to be identified. When a set with the same sequence code is broadcasted a second time, this embodiment allows the correct data to be stored in memory 340.

Returning to FIG. 5A, a control logic 352 is used to interface between the buttons of FIG. 1 and electrical portion 330. When the listener presses index button 110, control logic 352 looks up a register 356 that stores the set code that is being processed (e.g., A1). It delivers to memory management unit 350 this set code and a request to retrieve the corresponding index material. Memory management unit 350 retrieves the corresponding data in the index area and sends it to decompressor 354. At about the same time, control logic 352 directs signal switch 342 to connect decompressor 354 to D/A converter 358. The words "traffic condition" are pronounced by amplifier-speaker 344. Decompressor 354 sends a notification to control logic 352 after the words are processed. Control logic 352 increases the set code in register 356 by 1 (e.g., from A1 to A2).

In most cases, these words of the index are short. Thus, these words will be spoken before the listener can take additional action. In another embodiment of the invention, it may not be necessary for decompressor 354 to send the notification to control logic 352. Electrical portion 330 can assume that the words will be announced before the listen takes any other action.

If the listener presses index button 110 again within a predetermined time interval (e.g., one to two seconds), it is likely that the listen wishes to listen to other information. Thus, the above-described steps for selecting another index are repeated. Specifically, control logic 352 delivers the new set code to memory management unit 350, which retrieves the corresponding data in the index area and sends it to decompressor 354. The word "weather" is pronounced by amplifier-speaker 344. If the listener does not press index button 110 again within the predetermined time interval, control logic 352 assumes that the listener has made a selection. Control logic 352 then sends to memory management unit 350 the selected set code and a request that the corresponding on-demand program material be retrieved. Memory management unit 350 retrieves the corresponding data in the on-demand program area and sends it to decompressor 354. Control logic 352 directs signal switch 342 to connect decompressor 354 to D/A converter 358. The selected on-demand program (e.g., traffic condition) is played on amplifier-speaker 344. When all the data is processed, decompressor 354 notifies control logic 352. Control logic 352 directs switch 342 to connect main program processor 334 to converter 358. As a result, the main program material is automatically played.

Figure 7:
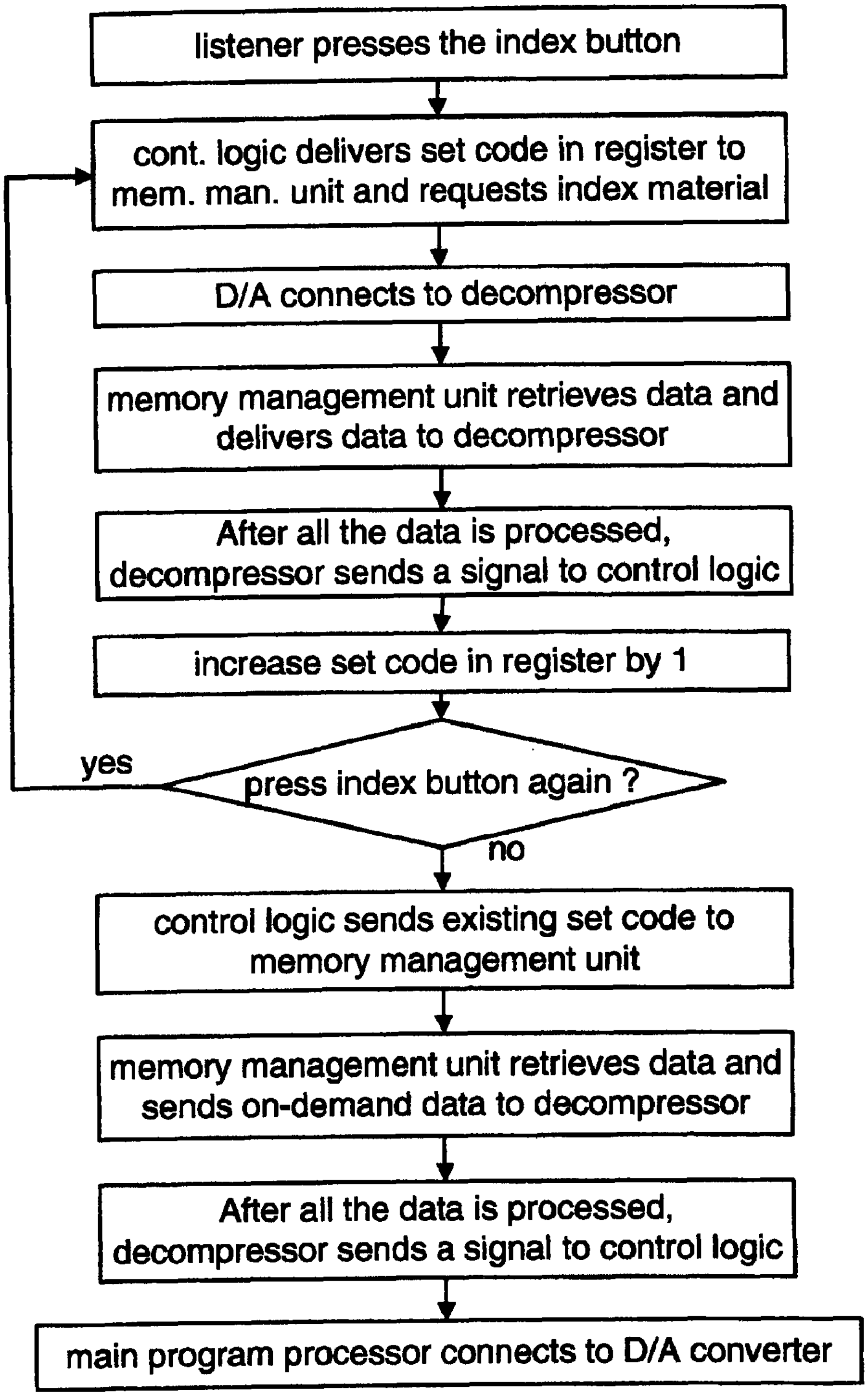
FIG. 7 is a flow chart showing the operation of a receiver of the present invention.

FIG. 7 shows a flowchart describing the above-described operation of the present invention.

Subsequent to the selection by index button 110, the listener can press switch button 108 anytime he/she wishes to listen to the selected on-demand program material instead of the main program material. Control logic 352 sends to memory management unit 350 the index code stored in register 356 and a request for on-demand program material. Control logic also directs signal switch 342 to connect D/A converter 358 to decompressor 354. After the on-demand program is played, control logic 352 directs switch 342 to connect main program processor 334 back to converter 358 again.

It should be noted that the index material and index button 110 are optional, as discussed above in connection with FIG. 4A. A similar procedure can be used to handle this situation. In this case, memory 340 does not need to have an index area.

In an alternative embodiment of FIG. 5A, decompressor 354 can be placed ahead of memory management unit 350. In this embodiment, the digital data for the index and on-demand program materials are decompressed first before being stored in memory 340. This embodiment may not use memory 340 as efficient as the original embodiment. On the other hand, the response time may be faster because the decompression operation has been performed prior to storage. It should also be noted that main program processor 334 and decompressor 354 may be software modules executed by the same data processing apparatus. In this case, signal switch 342 is replaced by a software command that causes the data processing apparatus to execute different software modules.

In one embodiment of the present invention, the operation of receiving signals from a broadcast station using tuner 332 and storing the index and on-demand program materials in memory 340 is performed at all times, ever after the listener turns off the radio receiver (e.g., using volume button 106). This requires that power be constantly supplied to electrical portion 330 even though other parts of radio receiver 102 do not receive power (e.g., display and amplifier-speaker). It is not a problem for automobile radio receivers because they can obtain power from the car battery at all times. An advantage of this embodiment is that the listen can hear the on-demand program materials instantaneously after the receiver is turned on by the listener. There is no need to wait for data to be received and stored into memory 340. This advantage is especially important when the listener wishes to hear traffic condition information before he/she leave the parking lot so that he/she can select the best route to the destination.

In another embodiment of electrical portion 330, each of decompressor 354 and main program processor 334 is connected to a separate D/A converter before connecting to switch 342. These two D/A converters can be individually designed to take advantage of the different characteristics of the two decompressors. In this case, D/A converter 358 in FIG. 5A is not needed.

In one embodiment of the present invention, a music quality decompressor (such as a MP3 decoder) is used to implement main program processor 334 and a voice quality decompressor (such as a G.723.1 decoder) is used to implement decompressor 354.

Figure 5B:
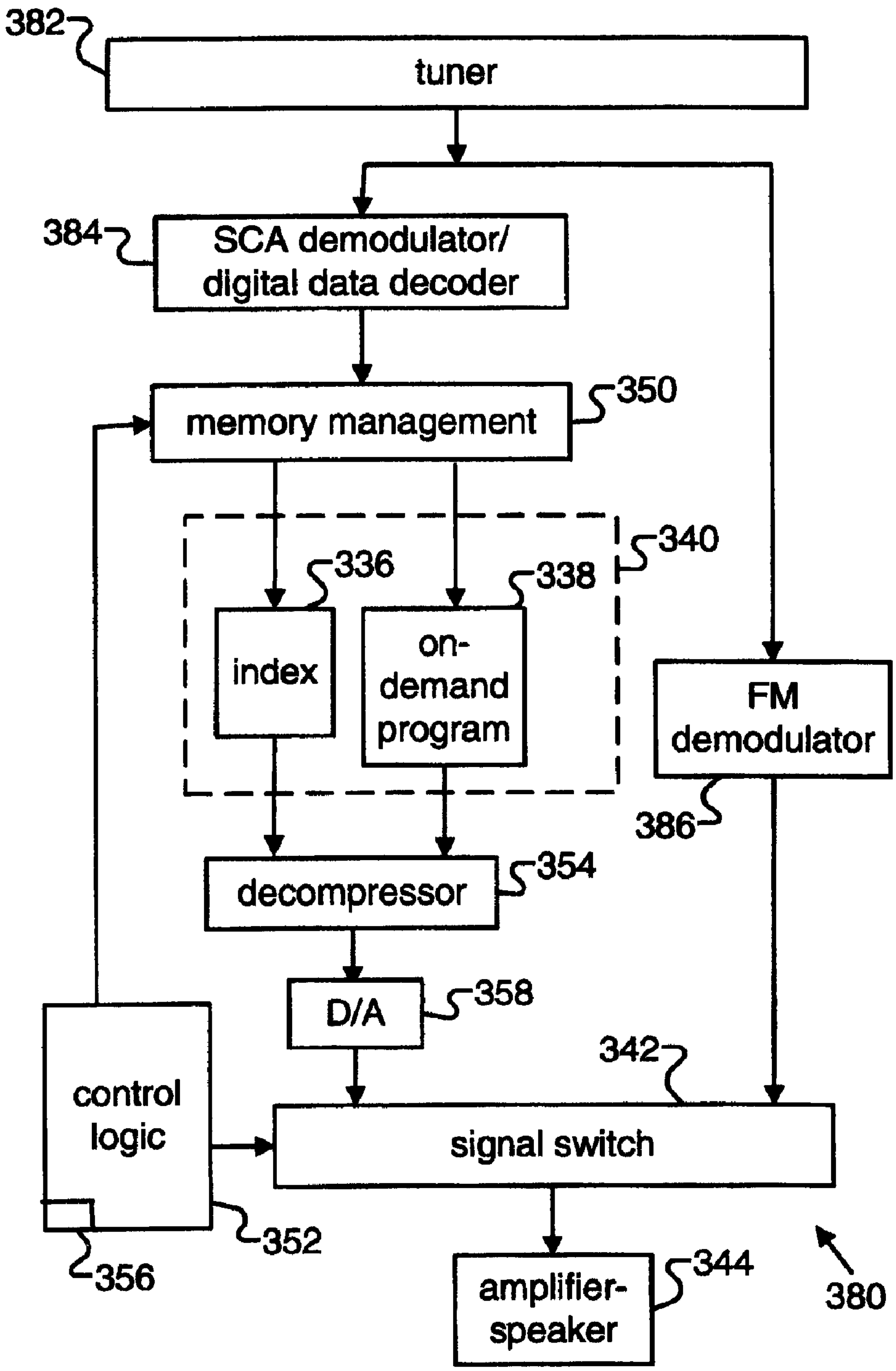

An implementation of the present invention in a conventional analog radio broadcast system is now described. FIG. 5B is a schematic diagram of an electrical portion 380 of an implementation of radio receiver 102. Reference numerals that are the same in FIGS. 5A and 5B refer to substantially the same elements. The structure of electrical portion 380 is similar to that of electrical portion 330, with the following exceptions: (1) The main program processor 334 corresponds to an FM demodulator 386, (2) a SCA demodulator/decoder 384 is used to separate the SCA band from the main carrier and decode the digital data therein, and (3) tuner 382 does not perform demodulation. FM demodulator 386 is an analog demodulator that derives an analog audio signal from a radio frequency signal. FM demodulator 386 and SCA demodulator/decoder 384 work on different frequency bands within an allocated FM channel mask, thus performing the operation of separator 348 of FIG. 5A.

The principle of the embodiments in FIGS. 5A and 5B is also applicable to the hybrid digital/analog radio broadcast system that simultaneously transmits both analog and digital signals within an allocated channel mask.

It should be noted that the tuners in FIGS. 5A-5B could also be programmable.

Extension to TV

The present invention can also be extended to TV (transmitted via cable or wireless). In TV broadcast, it is possible to introduce a datacast channel along side the main TV channel. As an example, some TV stations use the vertical blanking interval (VBI) to broadcast data. As another example, a portion of the high definition TV frequency spectrum can be used for datacasting. The bandwidth of these datacast channels is typically higher than that of the SCA. Thus, it is possible to use all or just a portion of the TV datacast channel for the present invention.

In order to facilitate disclosure of the present invention, FIGS. 4A-4B and 5A-5B are used. FIG. 4A would be applicable to the digital TV situation. In this case, data separator-selector 208 separates the datacast channel from the main TV broadcast channel. Because of the wider bandwidth of the TV datacast channel, decompressor 214 could be a music quality decompressor. In FIG. 4B, SCA demodulator/digital data decoder 235 would be a decoder for the datacast channel (e.g., VBI). FM demodulator block 238 would be the audio demodulator for the main TV channels. In FIG. 5A, separator 348 separates the datacast portion from the main TV channels. In FIG. 5B, SCA demodulator/digital data decoder 384 would be a decoder for the datacast channel (e.g., VBI). FM demodulator block 386 would be the audio demodulator for the main TV channel.

In these embodiments, the switch and index buttons could be built into a TV set or a remote controller associated with the TV set. If a remote controller is used, the numeric keys (used for selecting TV channels) could be used to select the on-demand information (e.g., key "1" for traffic condition, key "2" for weather, etc.)

In a separate embodiment of the present invention, the main channel could be a regular FM or AM radio channel while the on-demand program is broadcast on a TV datacast channel. In this way, the wider bandwidth of the TV datacast channel is available to radio listeners.

The invention has been described with reference to specific exemplary embodiments thereof. Various modification and changes may be made thereunto without departing from the broad spirit and scope of the invention. The specification and drawings are, accordingly, to be regarded in an illustrative rather than a restrictive sense; the invention is limited only by the provided claims.

I claim:

1. An apparatus for generating analog audio signal, comprising:

- a demodulator for retrieving digital data from wireless radio frequency signal, the digital data comprising a first set of compressed digital audio data associated with a first audio program and a second set of compressed digital audio data associated with a second audio program, the first set of compressed digital audio data having been compressed outside of the apparatus from a first set of digital audio data, the second set of compressed digital audio data having been compressed outside of the apparatus from a second set of digital audio data;
- a first decompressor comprising a first digital audio decompression algorithm;
- a second decompressor comprising a second digital audio decompression algorithm;
- a user interface allowing a user to select the first or the second audio program; and
- a control subsystem for applying the first decompressor to decompress the first set of compressed digital audio data if the user selects the first audio program and applying the second decompressor to decompress the second set of compressed digital audio data if the user selects the second audio program.

2. The apparatus of claim 1 wherein at least one of the first and the second decompression algorithms comprises a motion picture experts group decompression algorithm.

3. The apparatus of claim 1 wherein at least one of the first and the second decompression algorithms comprises a voice quality decompression algorithm.

4. The apparatus of claim 1 wherein at least one of the first and the second sets of compressed digital audio data has a bit rate of less than 7 kilobits per second.

5. The apparatus of claim 1 wherein the radio frequency signal comprises FM modulated radio frequency signal.

6. The apparatus of claim 1 wherein at least the demodulator is powered by a battery of an automobile.

7. The apparatus of claim 1 wherein one of the first and the second sets of compressed digital audio data has been compressed using a parametric compression algorithm.

8. The apparatus of claim 7 wherein another of the first and the second sets of compressed digital audio data has been compressed using a motion picture experts group compression algorithm.

9. The apparatus of claim 1 wherein the first decompressor and the second decompressor are software modules in a ROM.

10. The apparatus of claim 1 wherein the digital data comprises a command instructing the apparatus to perform a task.

11. An apparatus for sending wireless radio frequency signal to a receiving device, the apparatus comprising a wireless transmitter for transmitting the wireless radio frequency signal modulated by a stream of digital data, the stream of digital data comprising a first set of compressed digital audio data associated with a first audio program and a second set of compressed digital audio data associated with a second audio program, the first set of compressed digital audio data having been compressed outside of the receiving device using a first digital audio compression algorithm and the second set of compressed digital audio data having been compressed outside of the receiving device using a second digital audio compression algorithm.

12. The apparatus of claim 11 wherein the first compression algorithm comprises a motion picture experts group compression algorithm.

13. The apparatus of claim 11 wherein the second compression algorithm comprises a voice quality compression algorithm.

14. The apparatus of claim 13 wherein the second set of compressed digital audio data has a bit rate of less than 7 kilobits per second.

15. The apparatus of claim 11 wherein the radio frequency signal comprises FM modulated radio frequency signal.

16. The apparatus of claim 11 wherein the digital data comprises a command instructing the receiving device to perform a task.

17. The apparatus of claim 11 wherein one of the first and the second sets of compressed digital audio data has been compressed using a parametric compression algorithm and another of the first and the second sets of compressed digital audio data has been compressed using a motion picture experts group compression algorithm.

18. An apparatus for generating analog audio signal, comprising:

- a demodulator for retrieving digital data from wireless radio frequency signal, the digital data comprising a first set of compressed digital audio data associated with a first audio program and a second set of compressed digital audio data associated with a second audio program the first set of compressed digital audio data having been compressed outside of the apparatus from a first set of digital audio data, the second set of compressed digital audio data having been compressed outside of the apparatus from a second set of digital audio data;
- a first decompressor comprising a first digital audio decompression algorithm;
- a second decompressor comprising a second digital audio decompression algorithm;
- a memory system for storing the first set of compressed digital audio data retrieved from the demodulator and not the second set of compressed digital audio data retrieved from the demodulator;
- user interface allowing a user to select the first or the second audio program; and
- a control subsystem for applying the second decompressor to decompress the second set of compressed digital audio data if the user selects the second audio program and for retrieving the first set of compressed digital audio data from the memory system and delivering to the first decompressor when the user selects the first audio program.

19. The apparatus of claim 18 wherein at least one of the first and the second decompression algorithms comprises a voice quality decompression algorithm.

20. The apparatus of claim 18 wherein one of the first and the second sets of compressed digital audio data has been compressed using a parametric compression algorithm.

21. The apparatus of claim 20 wherein another of the first and the second sets of compressed digital audio data has been compressed using a motion picture experts group compression algorithm.

22. The apparatus of claim 18 wherein:

the digital data comprises a third set of compressed digital audio data associated with a third audio program, the memory system further for storing the third set of compressed digital audio data, the user interface comprises a first button to select one of the first and the third audio programs and a second button to select the second audio program, and the control subsystem further for retrieving the third set of compressed digital audio data from the memory system and delivering to the first decompressor when the user selects the third audio program.

23. The apparatus of claim 18 wherein the user interface allows the user to turn off power to at least a portion of the apparatus, and wherein the memory system stores the first set of compressed digital audio data even after the user activates the user interface to turn off the power.

24. The apparatus of claim 18 wherein the first decompressor and the second decompressor are software modules in a ROM.

25. The apparatus of claim 8 wherein the digital data comprises a command instructing the apparatus to perform a task.

* * * * *